(12) United States Patent
Fujita et al.

(10) Patent No.: US 9,777,879 B2
(45) Date of Patent: Oct. 3, 2017

(54) PULSATION DAMPER

(71) Applicant: DELPHI TECHNOLOGIES, INC., Troy, MI (US)

(72) Inventors: Mahoro M. Fujita, Fairport, NY (US); Kenneth J. Dauer, Lima, NY (US); Daniel F. Kabasin, Rochester, NY (US); Ravish S. Masti, Bangalore (IN); Youssef Kazour, Pittsford, NY (US)

(73) Assignee: DELPHI TECHNOLOGIES, INC., Troy, MI (US)

( * ) Notice: Subject to any disclaimer, the term of this patent is extended or adjusted under 35 U.S.C. 154(b) by 101 days.

(21) Appl. No.: 14/803,362

(22) Filed: Jul. 20, 2015

(65) Prior Publication Data
US 2017/0023165 A1    Jan. 26, 2017

(51) Int. Cl.
| | |
|---|---|
| *F16L 55/04* | (2006.01) |
| *F02M 37/00* | (2006.01) |
| *F02M 55/04* | (2006.01) |
| *F04B 39/00* | (2006.01) |
| *F04B 53/00* | (2006.01) |
| *F16L 55/053* | (2006.01) |

(52) U.S. Cl.
CPC ......... *F16L 55/04* (2013.01); *F02M 37/0041* (2013.01); *F02M 55/04* (2013.01); *F04B 39/0033* (2013.01); *F04B 53/002* (2013.01); *F02M 2200/31* (2013.01); *F02M 2200/8053* (2013.01); *F16L 55/053* (2013.01)

(58) Field of Classification Search
CPC ................ F16L 55/04; F02M 55/04

USPC ..................................... 138/30, 26
See application file for complete search history.

(56) References Cited

U.S. PATENT DOCUMENTS

| | | | |
|---|---|---|---|
| 8,419,391 B2 * | 4/2013 | Inoue ..................... | F02M 55/04 123/447 |
| 8,430,081 B2 | 4/2013 | Mancini et al. | |
| 8,662,868 B2 * | 3/2014 | Oikawa .................. | F04B 37/12 417/540 |
| 8,727,752 B2 | 5/2014 | Lucas | |
| 2008/0056914 A1 | 3/2008 | Usui et al. | |

(Continued)

FOREIGN PATENT DOCUMENTS

| | | |
|---|---|---|
| DE | 102004008590 B3 | 8/2005 |
| JP | 2011220198 A1 | 11/2011 |

(Continued)

*Primary Examiner* — Craig Schneider
*Assistant Examiner* — David Deal
(74) *Attorney, Agent, or Firm* — Joshua M. Haines

(57) ABSTRACT

A pulsation damper is disposed within a fluid volume defined by a fluid volume wall such that the pulsation damper is exposed to pressure pulsations within the fluid volume. The pulsation damper includes a pulsation damper first half having a first damper wall which is flexible in response to the pressure pulsations; a pulsation damper second half having a second damper wall which is flexible in response to the pressure pulsations; and a damping volume defined between the pulsation damper first half and the pulsation damper second half such that the damping volume is fluidly segregated from the fluid volume. One of the pulsation damper first half and the pulsation damper second half defines a spacing member which maintains separation between the fluid volume wall and one of the first damper wall and the second damper wall.

20 Claims, 4 Drawing Sheets

(56) References Cited

U.S. PATENT DOCUMENTS

2010/0209274 A1    8/2010   Oikawa et al.
2013/0052064 A1    2/2013   Oikawa et al.

FOREIGN PATENT DOCUMENTS

| WO | 2012/095718 A2 | 7/2012 |
|----|----------------|--------|
| WO | 2015011545 A1  | 1/2015 |
| WO | 2016023777 A1  | 2/2016 |

\* cited by examiner

PULSATION DAMPER

TECHNICAL FIELD OF INVENTION

The present invention relates to a pulsation damper; more particularly to a pulsation damper for damping pressure pulsations generated by a high pressure fuel pump; and still even more particularly to such a pulsation damper which is self-supporting.

BACKGROUND OF INVENTION

Historically, internal combustion engines have employed electric fuel pumps to pump fuel from a fuel tank of a motor vehicle to a fuel rail of the internal combustion engine. The fuel rail is used to distribute the fuel to a plurality of fuel injectors which in turn inject the fuel into an air intake manifold of the internal combustion where the fuel is mixed with air prior to being ingested into combustion chambers of the internal combustion engine through respective intake valves. Fuel injection systems where the fuel injectors inject the fuel into the air intake manifold are commonly referred to as port fuel injection systems. In port fuel injection systems, the electric fuel pump alone is sufficient to supply fuel at a pressure needed at the fuel injectors where the pressure is typically below 500 kPA. However, direct injection fuel injection systems have become increasingly common in an effort to maximize fuel economy and to minimize harmful emissions produced by the internal combustion engine. In direct injection fuel injection systems, the fuel injectors inject fuel directly into respective combustion chambers under high pressure where the fuel typically needs to be supplied at a pressure above 14 MPa. Since the electric fuel pump is not able to accommodate this magnitude of pressure, the electric fuel pump supplies fuel at low pressure to a high-pressure fuel pump which is typically in the form of a reciprocating plunger driven by a cam lobe of the internal combustion engine. The high-pressure fuel pump includes an electrically actuated intake or spill valve which allows fuel to enter a pressure chamber during the intake stroke of the plunger. During the pressure stroke of the plunger, the spill valve is closed, thereby allowing the plunger to decrease the volume of the pressure chamber, consequently pressurizing the fuel. When the fuel reaches a predetermined pressure, an outlet valve is opened under the force of the pressurized fuel and the fuel is communicated to the fuel rail and fuel injectors. In order to vary the pressure generated by the high-pressure fuel pump, the spill valve can be commanded to remain open for a portion of the compression stroke of the plunger, thereby decreasing the fuel pressure generated by the high-pressure fuel pump in order to accommodate different operating conditions of the internal combustion engine. However, when the spill valve remains open during a portion of the compression stroke of the plunger, pressure pulsations generated by the plunger can propagate upstream of the spill valve which can have undesirable effects on the electric fuel pump and other components in the fuel system. Consequently, these pressure pulsations need to be attenuated.

An example of a high-pressure fuel pump is shown in U.S. Pat. No. 8,430,081 to Mancini et al. on Apr. 30, 2013. In this example, the pressure pulsations are attenuated by a pair of pulsation dampers which are disposed within a fluid volume that is exposed to the pressure pulsations. Each pulsation damper includes first and second halves which define a sealed damping volume such that the first and second halves each include a damper wall that is configured to flex in response to the pressure pulsations, thereby decreasing the damping volume and attenuating the pressure pulsations. In order to allow the damper walls to flex in response to the pressure pulsations, it is important that the damper walls be exposed to the fuel within fluid volume. Consequently, the arrangement of U.S. Pat. No. 8,430,081 provides spacers between the pulsation dampers and also between each pulsation damper and the wall which defines the fluid volume in order to support the pulsation dampers, thereby suspending the damper walls within the fluid volume. As a result the arrangement of U.S. Pat. No. 8,430,081 requires many pieces that must be assembled, thereby requiring a great deal of packaging space and adding cost and complexity in the manufacturing process.

International Publication No. WO 2015/011545 A1 to Yabuuchi et al. on Jan. 29, 2015 shows another pulsation damper arrangement for high-pressure fuel pumps. In the arrangement of WO 2015/011545 A1, the pulsation dampers are a three-piece assembly comprising a first diaphragm and a second diaphragm separated by an attachment member. The attachment member includes a plurality of protrusions that extend radially outward and engage a complementary retention groove formed on the inner surface of the wall which defines the fluid volume. While the pulsation damper of WO 2015/011545 A1 is self-supporting, the attachment member adds an extra part, and consequently an extra weld, to the pulsation damper compared to U.S. Pat. No. 8,430,081. Furthermore, the pulsation damper of WO 2015/011545 A1 requires a retention groove to be formed on the inner surface of the wall which defines the fluid volume, thereby adding cost and complexity in manufacturing. A risk of the pulsation damper coming out of the retention groove in use also exists which could render the pulsation damper ineffective.

What is needed is a pulsation damper which minimizes or eliminates one or more of the shortcomings as set forth above.

SUMMARY OF THE INVENTION

Briefly described, a pulsation damper is provided which is disposed within a fluid volume defined by a fluid volume wall such that the pulsation damper is exposed to pressure pulsations within the fluid volume. The pulsation damper includes a pulsation damper first half having a first damper wall which is flexible in response to the pressure pulsations; a pulsation damper second half having a second damper wall which is flexible in response to the pressure pulsations; and a damping volume defined between the pulsation damper first half and the pulsation damper second half such that the damping volume is fluidly segregated from the fluid volume. One of the pulsation damper first half and the pulsation damper second half defines a spacing member which maintains separation between the fluid volume wall and one of the first damper wall and the second damper wall. Consequently, the pulsation damper is self-supporting and does not require additional components to maintain separation between the fluid volume wall and the first damper wall or the second damper wall thereby simplifying assembly. Also consequently, the pulsation damper can be made of only two pieces with a single weld joining the two pieces, thereby minimizing cost and manufacturing time. Furthermore, the space needed to implement the pulsation damper is minimized and the fluid volume wall does not need special features to accommodate the pulsation damper.

Further features and advantages of the invention will appear more clearly on a reading of the following detailed description of the preferred embodiment of the invention, which is given by way of non-limiting example only and with reference to the accompanying drawings.

BRIEF DESCRIPTION OF DRAWINGS

This invention will be further described with reference to the accompanying drawings in which.

DETAILED DESCRIPTION OF INVENTION

Figure 1:
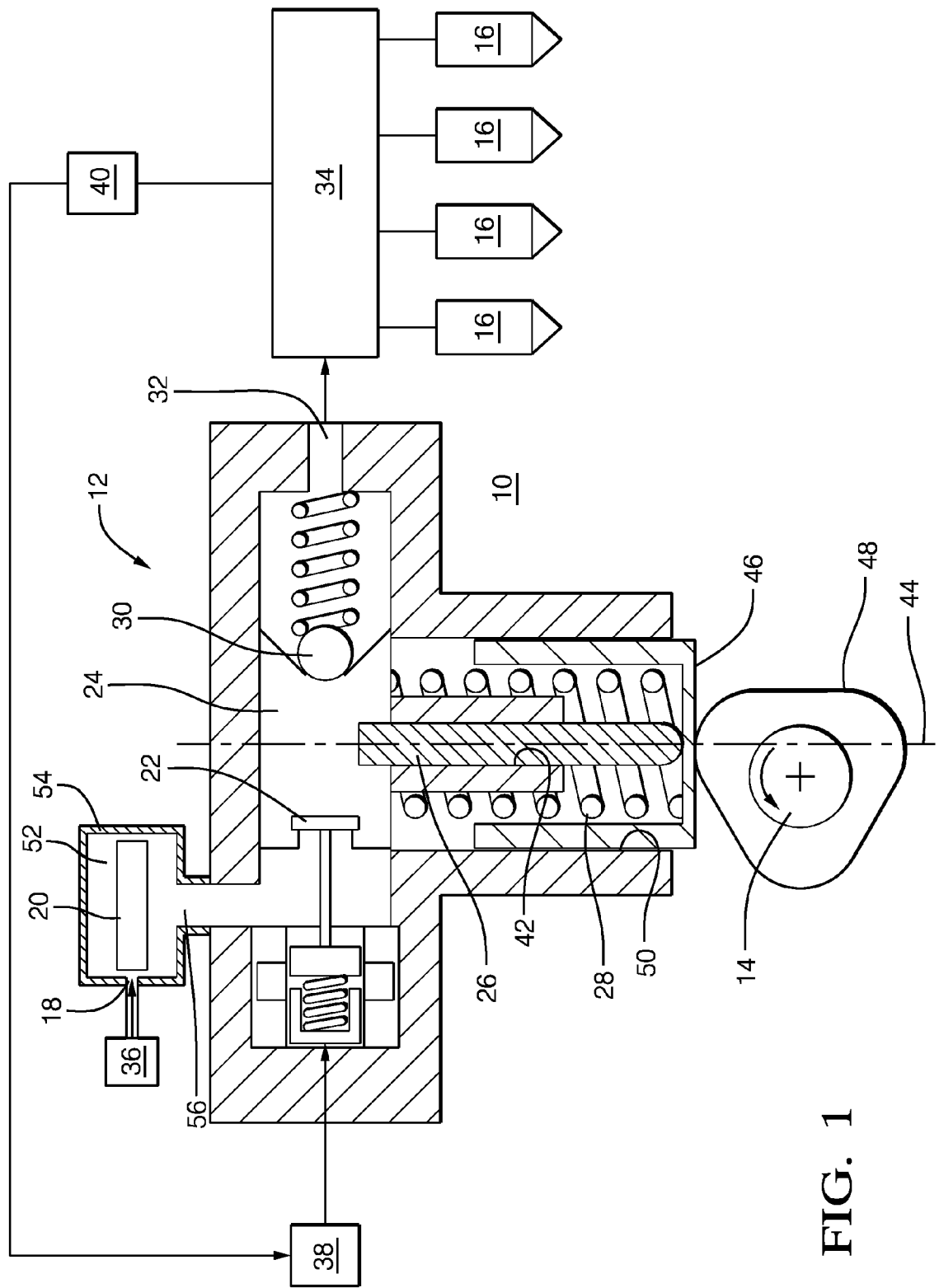
FIG. 1 is a schematic drawing of an internal combustion engine and a high pressure pump with a pulsation damper in accordance with the present invention.
Figure 2:
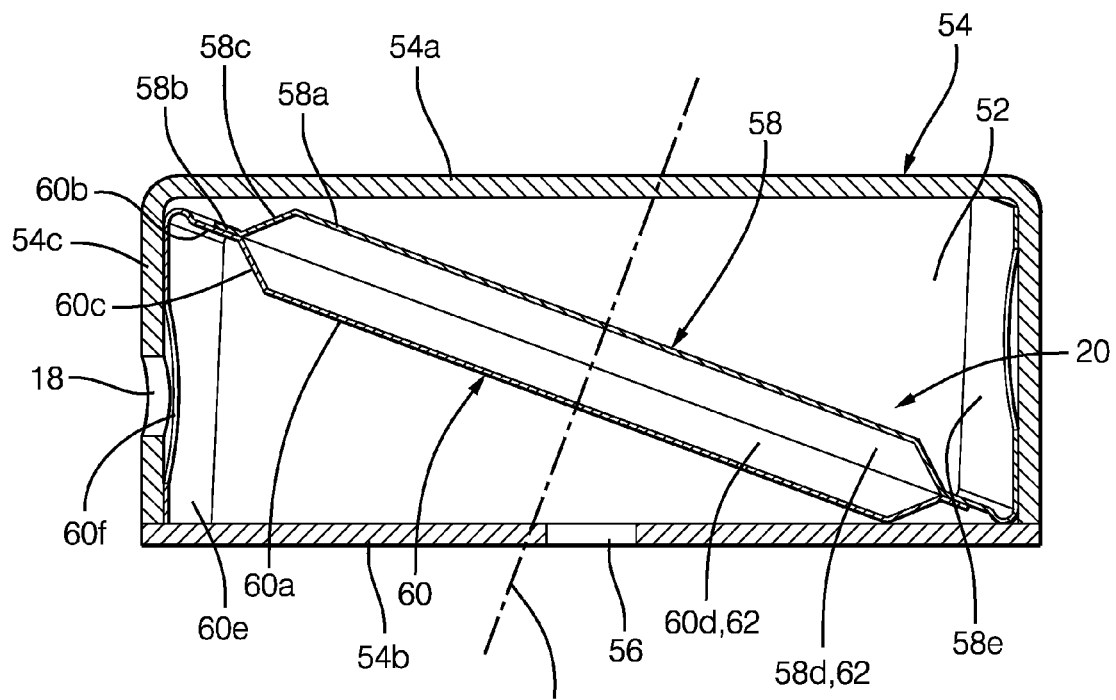
FIG. 2. is a cross-sectional view of a first pulsation damper in accordance with the present invention shown in a fluid volume.

In accordance with a preferred embodiment of this invention and referring to FIGS. 1 and 2, an internal combustion engine 10 is shown. Internal combustion engine 10 includes a fuel pump 12 which is driven by a camshaft 14 of internal combustion engine 10. Fuel pump 12 is used to deliver pressurized fuel to one or more fuel injectors 16, which may, for example only, inject the pressurized fuel directly into combustion chambers (not shown) of internal combustion engine 10.

Fuel pump 12 generally includes a fuel inlet 18, a pulsation damper 20, a spill valve 22, a pressure chamber 24, a pumping plunger 26, a return spring 28, an outlet valve 30, and a fuel outlet 32 which may be in fluid communication with a fuel rail 34 to which fuel injectors 16 are connected and receive pressurized fuel from. Fuel inlet 18 receives fuel from a fuel source 36, which may be a lift pump of a fuel tank, at a relatively low pressure. Spill valve 22 may be, by way of non-limiting example only, a solenoid operated valve which is controlled by a controller 38. Controller 38 may receive input from a pressure sensor 40 which supplies a signal indicative of the pressure of the fuel being supplied to fuel injectors 16. While pressure sensor 40 is shown arranged to read the fuel pressure within fuel rail 34, it should be understood that pressure sensor 40 may be positioned at other locations that are indicative of the pressure of the fuel being supplied to fuel injectors 16. Controller 38 sends signals to spill valve 22 to open and close spill valve 22 as necessary to achieve a desired fuel pressure at pressure sensor 40 as may be determined by current and anticipated engine operating demands. When spill valve 22 is opened while pumping plunger 26 is moving to increase the volume of pressure chamber 24, fuel from fuel inlet 18 is allowed to flow into pressure chamber 24.

Pumping plunger 26 is slidably received within a plunger bore 42 that is in fluid communication with pressure chamber 24. Pumping plunger 26 is reciprocated within a plunger bore 42 along a plunger axis 44 by camshaft 14 and return spring 28. Pumping plunger 26 includes a follower 46 at an axial end thereof that is distal from pressure chamber 24 for following a lobe 48 of camshaft 14. As shown in FIG. 1, follower 46 forms a sliding interface with lobe 48; however, follower 46 may alternatively form a rolling interface with lobe 48 by providing follower 46 with a roller (not shown) as is known in the art of cam followers. Follower 46 reciprocates within a follower bore 50 which may be, by way of non-limiting example only, a bore in the engine block, intake manifold, or cylinder head of internal combustion engine 10 or may alternatively be a bore in a separate housing of fuel pump 12. Follower 46 is guided by follower bore 50 which is substantially coaxial with plunger bore 42. After spill valve 22 has been closed, reciprocation of pumping plunger 26 toward pressure chamber 24 causes the fuel within pressure chamber 24 to be compressed. The pressurized fuel causes outlet valve 30 to open, thereby allowing pressurized fuel to be expelled from fuel outlet 32 to fuel rail 34 and fuel injectors 16.

Depending on the pressure required at fuel outlet 32, spill valve 22 may be open when pumping plunger 26 is moving toward pressure chamber 24. Consequently, if left uninhibited, pumping plunger 26 causes pressure pulsations which can propagate past spill valve 22 to fuel source 36 via fuel inlet 18. In order to mitigate the pressure pulsations generated by pumping plunger 26 when spill valve 22 is open, pulsation damper 20 is located within a fluid volume 52 which is exposed to the pressure pulsations. Fluid volume 52 is defined by a fluid volume wall 54 such that fluid volume 52 is in fluid communication with pressure chamber 24 via a fluid volume passage 56 only when spill valve 22 is open. Fluid volume wall 54 includes a fluid volume wall top 54a which opposes a fluid volume wall 54b and also includes a fluid volume wall side 54c which connects the perimeter of fluid volume wall top 54a to the perimeter of fluid volume wall bottom 54b. Fluid volume wall top 54a and fluid volume wall bottom 54b may each be substantially circular in shape, consequently, fluid volume wall side 54c is cylindrical and hollow. It should be noted that one or more of fluid volume wall top 54a, fluid volume wall bottom 54b, and fluid volume wall side 54c may be integrally formed from a single piece of material while one or more of fluid volume wall top 54a, fluid volume wall bottom 54b, and fluid volume wall side 54c may be formed from separate pieces of material that are subsequently joined together. As shown in FIG. 1, fluid volume 52 is located in series between fuel inlet 18 and pressure chamber 24 such that fuel that is communicated to pressure chamber 24 from fuel inlet 18 passes through fluid volume 52; however, it should now be understood that fluid volume 52 may alternatively be located in parallel such that fuel that is communicated to pressure chamber 24 from fuel inlet 18 does not need to pass through fluid volume 52.

Figure 3:
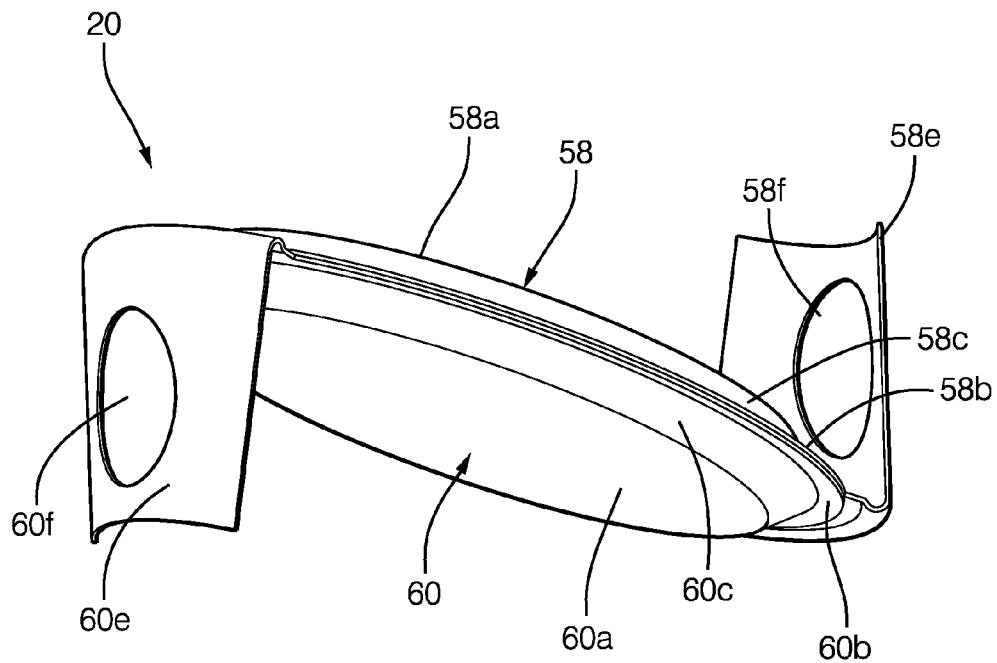
FIG. 3 is an isometric view of the pulsation damper of FIG. 2.

In a first arrangement as shown in FIGS. 2 and 3, pulsation damper 20 is a two-piece assembly comprising a pulsation damper first half 58 and a pulsation damper second half 60 which are sealingly joined together to define a damping volume 62 between pulsation damper first half 58 and pulsation damper second half 60. Pulsation damper first half 58 is defined by first damper wall 58a which is flexible in response to the pressure pulsations within fluid volume 52 such that first damper wall 58a is centered about a damper axis 64. Pulsation damper first half 58 is also defined by a first attachment flange 58b which is spaced axially from first damper wall 58a such that a first connecting wall 58c joins first damper wall 58a and first attachment flange 58b, consequently, pulsation damper first half 58 defines a first recess 58d. First attachment flange 58b is substantially planar and may be annular in shape. Pulsation damper first half 58 is also defined by a first spacing member 58e as will be described in greater detail later. Similarly, pulsation damper second half 60 is defined by second damper wall 60a which is flexible in response to the pressure pulsations within fluid volume 52 such that second damper wall 60a is centered about damper axis 64. Pulsation damper second half 60 is also defined by a second attachment flange 60b which is spaced axially from second damper wall 60a such that a second connecting wall 60c joins second damper wall 60a and second attachment flange 60b, consequently, pulsation damper first half 60 defines a second recess 60d. Second attachment flange 60b is substantially planar and may be annular in shape. Pulsation damper second half 60 is also defined by a second spacing member 60e as will be described in greater detail later. Pulsation damper first half 58 and pulsation damper second half 60 sealingly mate together at first attachment flange 58b and second attachment flange 60b such that first recess 58d and second recess 60d face each other and together comprise damping volume 62. First attachment flange 58b and second attachment flange 60b may be sealed together, by way of non-limiting example only, by welding, thereby fluidly segregating damping volume 62 from fluid volume 52. Damping volume 62 may be filled with ambient air or an inert gas such as pressurized nitrogen or other media which is capable of contracting to damp pressure pulsations and then expand when the pressure pulsation subsides. Alternatively, another method may be used such as a spring or foam within damping volume 62 in order to provide desirable damping characteristics without permanent deformation. As illustrated in FIG. 2, damping volume 62 represents ambient air or an inert gas, or in the case of foam, damping volume 62 represents the foam unsectioned.

First spacing member 58e and second spacing member 60e are diametrically opposed and extend from pulsation damper 20 in opposite directions. As shown, first spacing member 58e extends from first attachment flange 58b toward fluid volume wall top 54a such that first spacing member 58e extends axially beyond first damper wall 58a. Consequently, first spacing member 58e maintains exposure of first damper wall 58a to the pressure pulsations within fluid volume 52 by maintaining separation between first damper wall 58a and fluid volume wall 54 by contacting fluid volume wall top 54a. Similarly, second spacing member 60e extends from second attachment flange 60b toward fluid volume wall bottom 54b such that second spacing member 60e extends axially beyond second damper wall 60a. Consequently, second spacing member 60e maintains exposure of second damper wall 60a to the pressure pulsations within fluid volume 52 by maintaining separation between second damper wall 60a and fluid volume wall 54 by contacting fluid volume wall bottom 54b. Furthermore, since first spacing member 58e and second spacing member 60e are diametrically opposed and extend from pulsation damper 20 in opposite directions, damping volume 62 is positioned diagonally within fluid volume 52, thereby maximizing the size of damping volume 62, first damper wall 58a, and second damper wall 60a which is important for effective damping of the pressure pulsations.

First spacing member 58e may include a first spacing member aperture 58f extending therethrough such that first spacing member aperture 58f provides a path for fuel to flow from fuel inlet 18 to fluid volume 52 if first spacing member 58e should become oriented within fluid volume 52 to be aligned with fuel inlet 18. Similarly, second spacing member 60e may include a second spacing member aperture 60f extending therethrough such that second spacing member aperture 60f provides a path for fuel to flow from fuel inlet 18 to fluid volume 52 if second spacing member 60e should become oriented within fluid volume 52 to be aligned with fuel inlet 18. Consequently, first spacing member aperture 58f and second spacing member aperture 60f eliminate the need to maintain a specific orientation of pulsation damper 20 within fluid volume 52. Alternatively, first spacing member aperture 58f and second spacing member aperture 60f may be omitted, and first spacing member 58e and second spacing member 60e may be formed to provide sufficient radial clearance between first spacing member 58e and fluid volume wall side 54c and between second spacing member 60e and fluid volume wall side 54c such that first spacing member 58e and second spacing member 60e do not inhibit flow of fuel from fuel inlet 18 into fluid volume 52.

As described herein, pulsation damper first half 58 and pulsation damper second half 60 may be formed to be identical, by way of non-limiting example only, using sheet metal and metal stamping and bending techniques. Since pulsation damper first half 58 and pulsation damper second half 60 are arranged with first spacing member 58e diametrically opposing second spacing member 60e, it is inconsequential whether first spacing member 58e faces toward fluid volume wall top 54a or if second spacing member 60e faces toward fluid volume wall top 54a. Furthermore, since first spacing member 58e and second spacing member 60e are configured to permit flow from fluid inlet to fluid volume 52 when first spacing member 58e or second spacing member 60e is aligned with fuel inlet 18, there is no need to radially orient pulsation damper 20 within fluid volume 52. In this way, assembly of pulsation damper 20 is eased since care need not be taken to orient pulsation damper 20 within fluid volume 52 in any particular way.

Figure 4:
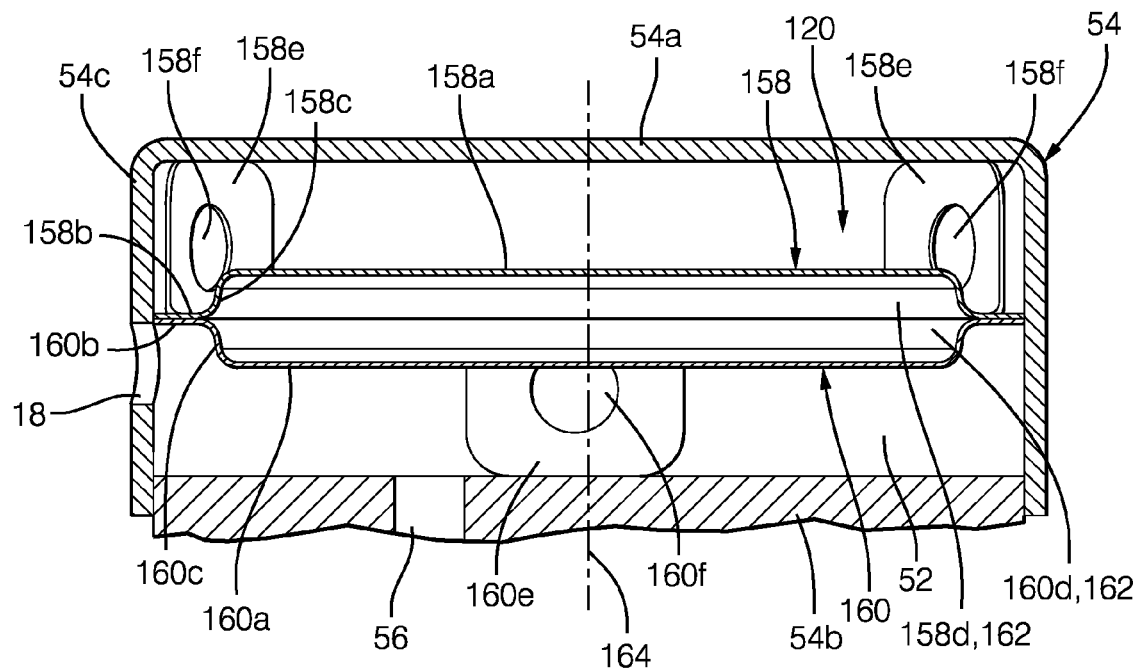
FIG. 4 is a cross-sectional view of a second pulsation damper in accordance with the present invention shown in a fluid volume.
Figure 5:
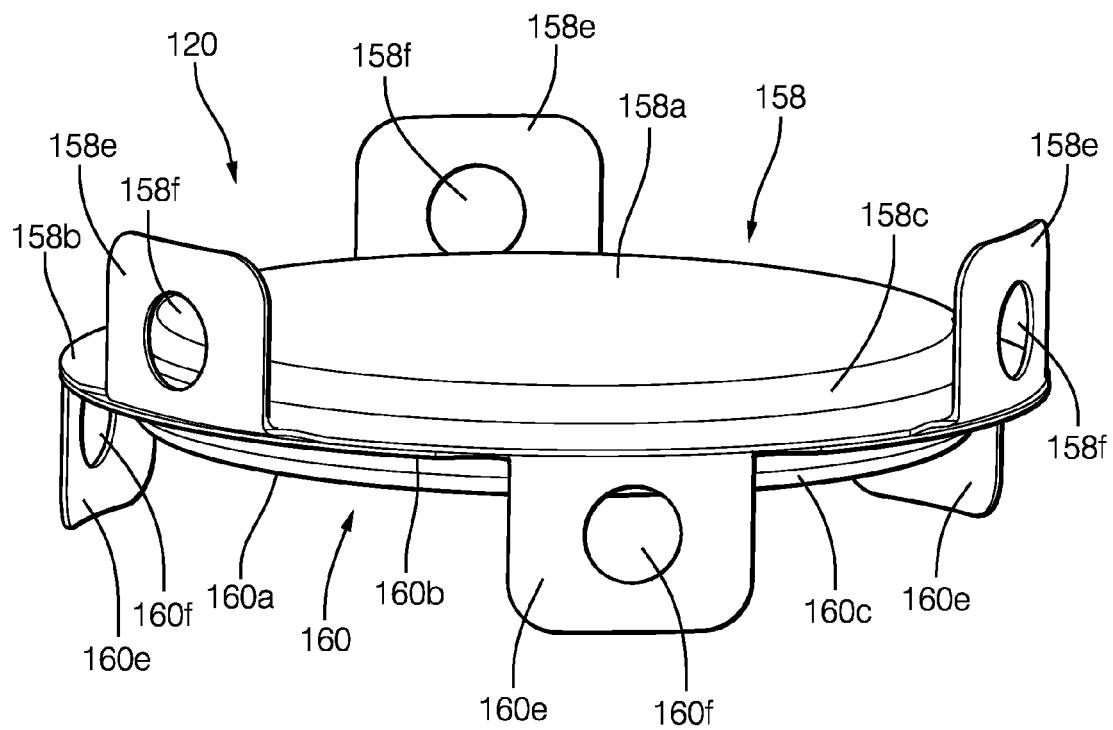
FIG. 5 is an isometric view of the pulsation damper of FIG. 4.

In a second arrangement as shown in FIGS. 4 and 5, a pulsation damper 120 may be substituted for pulsation damper 20. Pulsation damper 120 is a two-piece assembly comprising a pulsation damper first half 158 and a pulsation damper second half 160 which are sealingly joined together to define a damping volume 162 between pulsation damper first half 158 and pulsation damper second half 160. Pulsation damper first half 158 is defined by a first damper wall 158a which is flexible in response to the pressure pulsations within fluid volume 52 such that first damper wall 158a is centered about a damper axis 164. Pulsation damper first half 158 is also defined by a first attachment flange 158b which is spaced axially from first damper wall 158a such that a first connecting wall 158c joins first damper wall 158a and first attachment flange 158b, consequently, pulsation damper first half 158 defines a first recess 158d. First attachment flange 158b is substantially planar and may be annular in shape. Pulsation damper first half 158 is also defined by a plurality of first spacing members 158e as will be described in greater detail later. Similarly, pulsation damper second half 160 is defined by second damper wall 160a which is flexible in response to the pressure pulsations within fluid volume 52 such that second damper wall 160a is centered about damper axis 164. Pulsation damper second half 160 is also defined by a second attachment flange 160b which is spaced axially from second damper wall 160a such that a second connecting wall 160c joins second damper wall 160a and second attachment flange 160b, consequently, pulsation damper first half 160 defines a second recess 160d. Second attachment flange 160b is substantially planar and may be annular in shape. Pulsation damper second half 160 is also defined by a second spacing member 160e as will be described in greater detail later. Pulsation damper first half 158 and pulsation damper second half 160 sealingly mate together at first attachment flange 158b and second attachment flange 160b such that first recess 158d and second recess 160d face each other and together comprise damping volume 162. First attachment flange 158b and second attachment flange 160b may be sealed together, by way of non-limiting example only, by welding, thereby fluidly segregating damping volume 162 from fluid volume 52. Damping volume 162 may be filled with ambient air or an inert gas such as pressurized nitrogen or other media which is capable of contracting to damp pressure pulsations and then expand when the pressure pulsation subsides. Alternatively, another method may be used such as a spring or foam within damping volume 162 in order to provide desirable damping characteristics without permanent deformation. As illustrated in FIG. 4, damping volume 162 represents ambient air or an inert gas, or in the case of foam, damping volume 162 represents the foam unsectioned.

As shown, first spacing members 158e extend from first attachment flange 158b in a direction toward fluid volume wall top 54a such that first spacing members 158e may be substantially equiangularly spaced around first attachment flange 158b and such that first spacing members 158e extend axially beyond first damper wall 158a. While three first spacing members 158e have been illustrated, it should be understood that a greater or lesser number of first spacing members 158e may be used, and in the case of a single first spacing member 158e, first spacing member 158e may be annular in shape. Consequently, first spacing members 158e maintain exposure of first damper wall 158a to the pressure pulsations within fluid volume 52 by maintaining separation between first damper wall 158a and fluid volume wall 54 by contacting fluid volume wall top 54a. Similarly, second spacing members 160e extend from second attachment flange 160b in a direction toward fluid volume wall bottom 54b such that second spacing members 160e may be substantially equiangularly spaced around second attachment flange 160b and such that second spacing members 160e extend axially beyond second damper wall 160a. Furthermore, second spacing members 160e may be spaced around the perimeter of pulsation damper 120 such that second spacing members 160e are not aligned with first spacing members 158e and preferably such that each second spacing member 160e is spaced equally between adjacent first spacing members 158e around the perimeter of pulsation damper 120. While three second spacing members 160e have been illustrated, it should be understood that a greater or lesser number of second spacing members 160e may be used, and in the case of a single second spacing member 160e, second spacing member 160e may be annular in shape. Consequently, second spacing members 160e maintain exposure of second damper wall 160a to the pressure pulsations within fluid volume 52 by maintaining separation between second damper wall 160a and fluid volume wall 54 by contacting fluid volume wall bottom 54b.

First spacing members 158e may each include a first spacing member aperture 158f extending therethrough such that first spacing member apertures 158f prevent first spacing members 158e from restricting fuel flow from fuel inlet 18 to fluid volume 52 if one of first spacing members 158e should become oriented within fluid volume 52 to be aligned with fuel inlet 18. Similarly, second spacing members 160e may each include a second spacing member aperture 160f extending therethrough such that second spacing member apertures 160f prevent first spacing members 158e from restricting fuel flow from fuel inlet 18 to fluid volume 52 if one of second spacing members 160e should become oriented within fluid volume 52 to be aligned with fuel inlet 18. Consequently, first spacing member apertures 158f and second spacing member apertures 160f eliminate the need to maintain a specific orientation of pulsation damper 120 within fluid volume 52. Alternatively, first spacing member apertures 158f and second spacing member apertures 160f may be omitted, and first spacing members 158e and second spacing members 160e may be formed to provide sufficient radial clearance between first spacing members 158e and fluid volume wall side 54c and between second spacing members 160e and fluid volume wall side 54c such that first spacing members 158e and second spacing members 160e do not inhibit flow of fuel from fuel inlet 18 into fluid volume 52.

As described herein, pulsation damper first half 158 and pulsation damper second half 160 may be formed to be identical, by way of non-limiting example only, using sheet metal and metal stamping and bending techniques. Since pulsation damper first half 158 and pulsation damper second half 160 with first spacing members 158e and second spacing members 160e that are substantially identical, it is inconsequential whether first spacing members 158e face toward fluid volume wall top 54a or if second spacing members 160e face toward fluid volume wall top 54a. Furthermore, since first spacing members 158e and second spacing members 160e are configured to not inhibit flow from fuel inlet 18 to fluid volume 52 when one of first spacing members 158e or one of second spacing members 160e is aligned with fuel inlet 18, there is no need to radially orient pulsation damper 120 within fluid volume 52. In this way, assembly of pulsation damper 120 is eased since care need not be taken to orient pulsation damper 120 within fluid volume 52 in any particular way.

Figure 6:
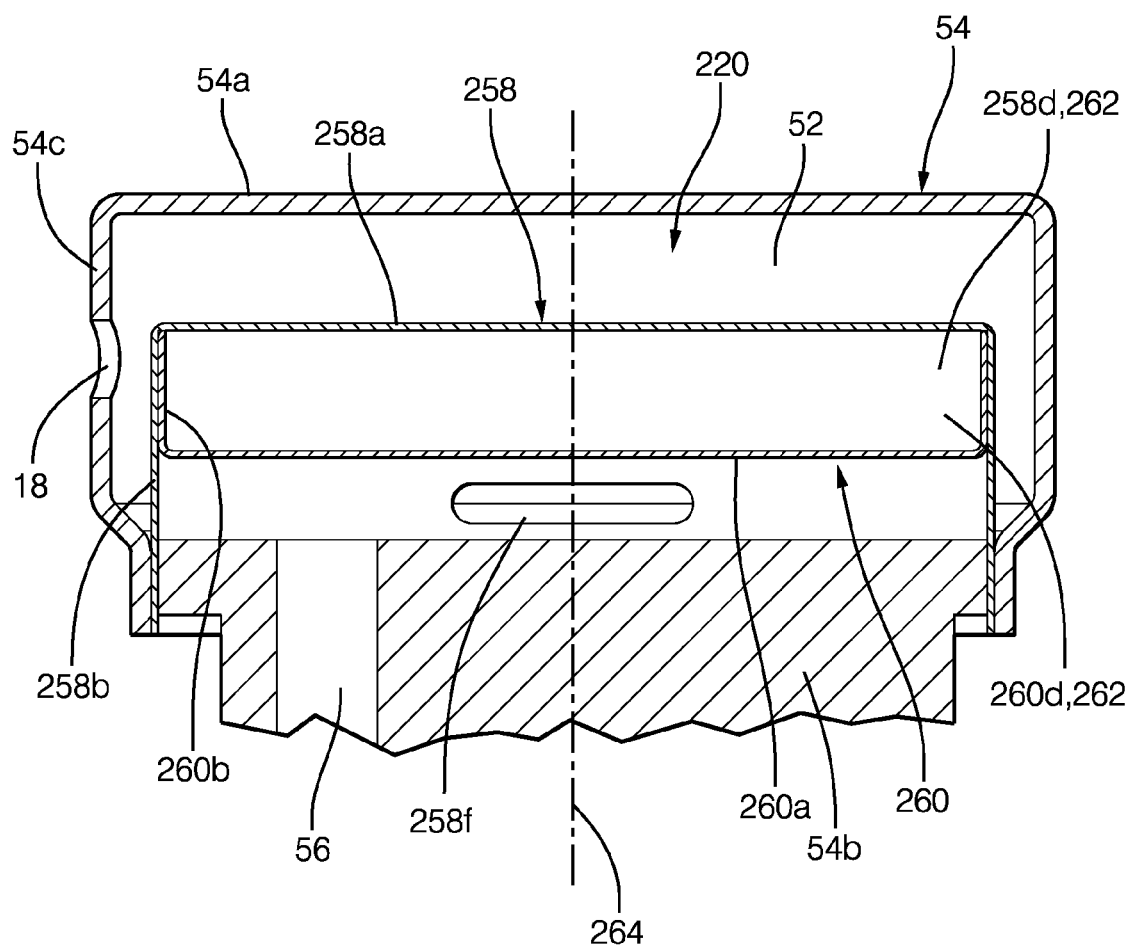
FIG. 6 is a cross-sectional view of a third pulsation damper in accordance with the present invention shown in a fluid volume.

In a third arrangement as shown in FIG. 6, a pulsation damper 220 may be substituted for pulsation damper 20 or pulsation damper 120. Pulsation damper 220 is a two-piece assembly comprising a pulsation damper first half 258 and a pulsation damper second half 260 which are sealingly joined together to define a damping volume 262 between pulsation damper first half 258 and pulsation damper second half 260. Pulsation damper first half 258 is defined by a first damper wall 258a which is flexible in response to the pressure pulsations within fluid volume 52 such that first damper wall 258a is centered about a damper axis 264. Pulsation damper first half 258 is also defined by a first damper sidewall 258b which is hollow and cylindrical and extends substantially perpendicular to first damper wall 258a such that first damper sidewall 258b is centered about damper axis 264, consequently, pulsation damper first half 258 defines a first recess 258d. First damper sidewall 258b also acts as a spacing member as will be described in greater detail later. Similarly, pulsation damper second half 260 is defined by second damper wall 260a which is flexible in response to the pressure pulsations within fluid volume 52 such that second damper wall 260a is centered about damper axis 264. Pulsation damper second half 260 is also defined by a second damper sidewall 260b which is hollow and cylindrical and extends substantially perpendicular to second damper wall 260a such that second damper sidewall 260b is centered about damper axis 264, consequently, pulsation damper second half 260 defines a second recess 260d. Pulsation damper second half 260 is received within first damper sidewall 258b such that second damper sidewall 260b abuts pulsation damper first damper wall 258a, thereby defining a predetermined axial offset between first damper wall 258a and second damper wall 260a. First damper sidewall 258b and second damper sidewall 260b sealing mate together at the inner periphery and the outer periphery respectively such that damping volume 262 is defined between first damper wall 258a and second damper wall 260a. First damper sidewall 258b and second damper sidewall 260b may be sealed together, by way of non-limiting example only, by welding, thereby fluidly segregating damping volume 262 from fluid volume 52. Damping volume 262 may be filled with ambient air or an inert gas such as pressurized nitrogen or other media which is capable of contracting to damp pressure pulsations and then expand when the pressure pulsation subsides. Alternatively, another method may be used such as a spring or foam within damping volume 262 in order to provide desirable damping characteristics without permanent deformation. As illustrated in FIG. 6, damping volume 262 represents ambient air or an inert gas, or in the case of foam, damping volume 262 represents the foam unsectioned.

As shown, first damper sidewall 258b extends axially beyond pulsation damper second half 260 such that the inner periphery of first damper sidewall 258b mates with fluid volume wall bottom 54b and the outer periphery of first damper sidewall 258b mates with fluid volume wall side 54c. First damper sidewall 258b, fluid volume wall bottom 54b, and fluid volume wall side 54c may be sealingly fixed together, by way of non-limiting example only, by welding. Also as shown, first damper sidewall 258b positions first damper wall 258a and second damper wall 260a within fluid volume 52 to offset first damper wall 258a and second damper wall 260a from fluid volume wall 54. Consequently, first damper sidewall 258b maintains exposure of first damper wall 258a and second damper wall 260a to the pressure pulsations within fluid volume 52 by maintaining separation between first damper wall 258a and fluid volume wall 54 and also between second damper wall 260a and fluid volume wall 54. First damper sidewall 258b includes a plurality of apertures 258f extend radially therethrough such that apertures 258f are positioned axially between pulsation damper second half 260 and fluid volume wall bottom 54b. Apertures 258f allow pressure pulsations to reach first damper wall 258a from fluid volume passage 56 and also allow fuel to flow from fuel inlet 18 to fluid volume passage 56.

As described herein, pulsation damper first half 258 and pulsation damper second half 260 may be formed, by way of non-limiting example only, using sheet metal and metal stamping and bending techniques. The radial orientation of pulsation damper 220 is not important, so assembly of pulsation damper 220 is eased since care need not be taken to orient pulsation damper 220 within fluid volume 52 in any particular way, other than to ensure that first damper sidewall 258b is oriented to mate with fluid volume wall bottom 54b.

In operation first damper walls 58a, 158a, 258a and second damper walls 60a, 160a, 260a flex resiliently inward and outward, thereby decreasing and increasing respectively the size of damping volume 62, 162, 262 respectively based on the cyclic pressure pulsations generated by pumping plunger 26. Flexing inward of first damper walls 58a, 158a, 258a and second damper walls 60a, 160a, 260a mitigates pressure pulsations to an acceptable level that are propagated to fuel source 36.

Pulsation dampers 20, 120, 220 as described herein provide self-supporting arrangements that minimize the number of components, thereby simplifying assembly and minimizing cost. Furthermore, pulsation dampers 20, 120, 220 do not require features to be added to fluid volume wall 54 in order to aid in their support and there is no risk of pulsation dampers 20, 120, 220 shifting in use to a position that would be detrimental to their effectiveness in damping pressure pulsations. Also furthermore pulsation dampers 20, 120, 220 are able to more effectively utilize fluid volume 54, thereby reducing packaging size.

While this invention has been described in terms of preferred embodiments thereof, it is not intended to be so limited, but rather only to the extent set forth in the claims that follow.

We claim:

1. A pulsation damper disposed within a fluid volume defined by a fluid volume wall, said pulsation damper being exposed to pressure pulsations within said fluid volume, said pulsation damper comprising:
    a pulsation damper first half having a first damper wall which is flexible in response to said pressure pulsations, said pulsation damper first half also having a first attachment flange;
    a pulsation damper second half having a second damper wall which is flexible in response to said pressure pulsations, said pulsation damper second half also having a second attachment flange; and
    a damping volume defined between said pulsation damper first half and said pulsation damper second half such that said damping volume is fluidly segregated from said fluid volume by said first attachment flange mating with said second attachment flange;
    wherein one of said pulsation damper first half and said pulsation damper second half defines a first spacing member which extends only from an outer-most perimeter of said first attachment flange or said second attachment flange of said one of said pulsation damper first half and said pulsation damper second half, said first spacing member maintaining separation between said fluid volume wall and one of said first damper wall and said second damper wall.

2. A pulsation damper as in claim 1 wherein:
    said pulsation damper first half defines said first spacing member; and
    said pulsation damper second half defines a second spacing member which extends only from an outer-most perimeter of said second attachment flange of said pulsation damper second half, said first spacing member maintaining separation between said fluid volume wall and the other of said first damper wall and said second damper wall.

3. A pulsation damper as in claim 2 wherein:
    said first spacing member maintains separation between said first damper wall and said fluid volume wall; and
    said second spacing member maintains separation between said second damper wall and said fluid volume wall.

4. A pulsation damper as in claim 2 wherein:
    said first damper wall and said second damper wall are centered about a damper axis; and
    said first spacing member and said second spacing member are diametrically opposed.

5. A pulsation damper as in claim 4 wherein said first spacing member and said second spacing member position said pulsation damper diagonally within said fluid volume.

6. A pulsation damper as in claim 4 wherein:
    said first spacing member extends axially beyond said first damper wall; and
    said second spacing member extends axially beyond said second damper wall.

7. A pulsation damper as in claim 2 wherein:
    said fluid volume wall is defined by a fluid volume wall top, a fluid volume wall bottom which is opposed to said fluid volume wall top, and a fluid volume wall side which connects perimeters of said fluid volume wall top and said fluid volume wall bottom;

said first spacing member maintains separation between said first damper wall and said fluid volume wall top by contacting one of said fluid volume wall top and said fluid volume wall bottom; and said second spacing member maintains separation between said second damper wall and said fluid volume wall bottom by contacting the other of said fluid volume wall top and said fluid volume wall bottom.

8. A pulsation damper as in claim 2 wherein:

said fluid volume wall is defined by a fluid volume wall top, a fluid volume wall bottom which is opposed to said fluid volume wall top, and a fluid volume wall side which connects perimeters of said fluid volume wall top and said fluid volume wall bottom; and wherein said first spacing member and said second spacing member position said pulsation damper diagonally between said fluid volume wall top and said fluid volume wall bottom within said fluid volume.

9. A pulsation damper as in claim 2 wherein:

said fluid volume wall is defined by a fluid volume wall top, a fluid volume wall bottom which is opposed to said fluid volume wall top, and a fluid volume wall side which connects perimeters of said fluid volume wall top and said fluid volume wall bottom and which includes an inlet passage therethrough;

said first spacing member includes a first spacing member aperture extending therethrough which prevents said first spacing member from blocking said inlet passage if said first spacing member is aligned with said inlet passage; and said second spacing member includes a second spacing member aperture extending therethrough which prevents said second spacing member from blocking said inlet passage if said second spacing member is aligned with said inlet passage.

10. A pulsation damper as in claim 2 wherein:

said first spacing member is one of a plurality of first spacing members defined by said pulsation damper first half and circumferentially spaced about said pulsation damper first half; and said second spacing member is one of a plurality of second spacing members defined by said and circumferentially spaced about said pulsation damper second half.

11. A pulsation damper as in claim 10 wherein:

said fluid volume wall is defined by a fluid volume wall top, a fluid volume wall bottom which is opposed to said fluid volume wall top, and a fluid volume wall side which connects perimeters of said fluid volume wall top and said fluid volume wall bottom;

said plurality of first spacing members maintains separation between said first damper wall and said fluid volume wall top by contacting one of said fluid volume wall top and said fluid volume wall bottom; and said plurality of second spacing members maintains separation between said second damper wall and said fluid volume wall bottom by contacting the other of said fluid volume wall top and said fluid volume wall bottom.

12. A pulsation damper as in claim 10 wherein:

said fluid volume wall is defined by a fluid volume wall top, a fluid volume wall bottom which is opposed to said fluid volume wall top, and a fluid volume wall side which connects perimeters of said fluid volume wall top and said fluid volume wall bottom and which includes an inlet passage therethrough;

each of said plurality of first spacing members includes a first spacing member aperture extending therethrough which prevents each of said plurality of first spacing members from blocking said inlet passage if one of said plurality of first spacing members is aligned with said inlet passage; and each of said plurality of second spacing members includes a second spacing member aperture extending therethrough which prevents each of said plurality of second spacing members from blocking said inlet passage if one of said plurality of second spacing members is aligned with said inlet passage.

13. A pulsation damper as in claim 10 wherein:

said first damper wall and said second damper wall are centered about a damper axis;

each of said plurality of first spacing members extends axially beyond said first damper wall; and each of said plurality of second spacing members extends axially beyond said second damper wall.

14. A pulsation damper as in claim 1 wherein:

said first damper wall and said second damper wall are centered about a damper axis; and said first spacing member extends axially beyond said one of said first damper wall and said second damper wall.

15. A pulsation damper as in claim 1 wherein:

said first damper wall is centered about an axis;

said first spacing member is cylindrical and hollow and extends axially from said first damper wall; and said second damper wall is centered about said axis and is located within said first spacing member.

16. A pulsation damper as in claim 15 wherein said pulsation damper second half includes a second damper sidewall which extends axially from said second damper wall.

17. A pulsation damper as in claim 16 wherein said second damper sidewall extends toward said first damper wall.

18. A pulsation damper as in claim 15 wherein:

said fluid volume wall is defined by a fluid volume wall top, a fluid volume wall bottom which is opposed to said fluid volume wall top and which includes a fluid volume passage therethrough, and a fluid volume wall side which connects perimeters of said fluid volume wall top and said fluid volume wall bottom; and said first spacing member includes a first spacing member aperture therethrough which places said fluid volume wall bottom in fluid communication with said first damper wall.

19. A pulsation damper as in claim 15 wherein:

said fluid volume wall is defined by a fluid volume wall top, a fluid volume wall bottom which is opposed to said fluid volume wall top and which includes a fluid volume passage therethrough, and a fluid volume wall side which connects perimeters of said fluid volume wall top and said fluid volume wall bottom and which includes an inlet passage therethrough;

said first spacing member includes a first spacing member aperture therethrough which allows fluid communication between said inlet passage and said fluid volume passage.

20. A pulsation damper as in claim 1 wherein said damping volume includes one of ambient air, an inert gas, and foam.

* * * * *